No. 743,878. PATENTED NOV. 10, 1903.
W. S. JACKSON.
ELECTRIC BLOCK SIGNAL.
APPLICATION FILED MAR. 5, 1903.
NO MODEL. 5 SHEETS—SHEET 1.
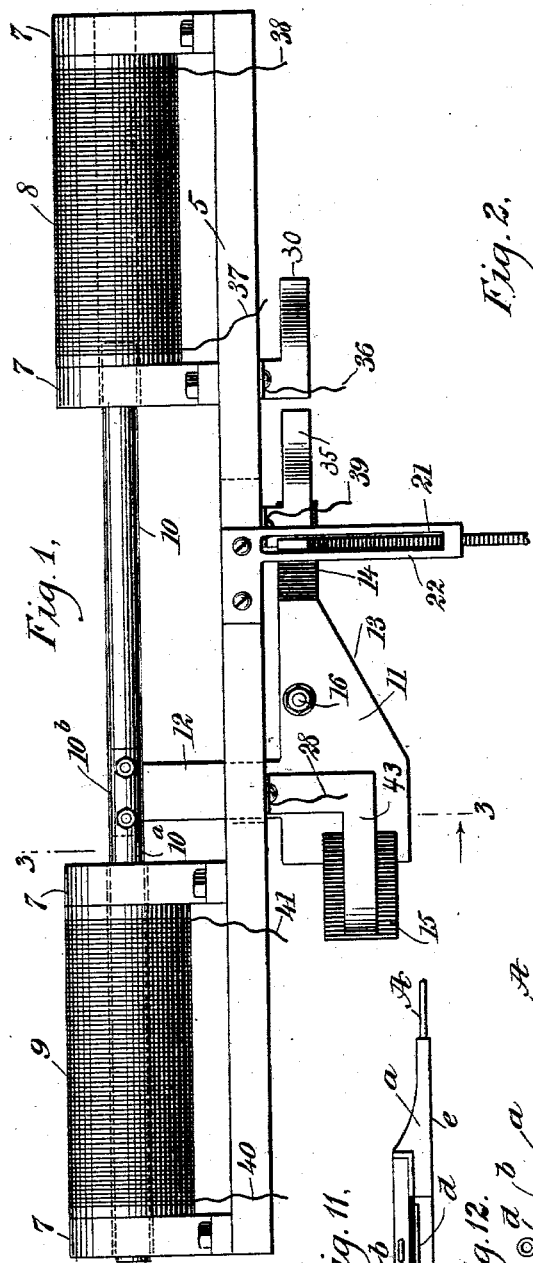
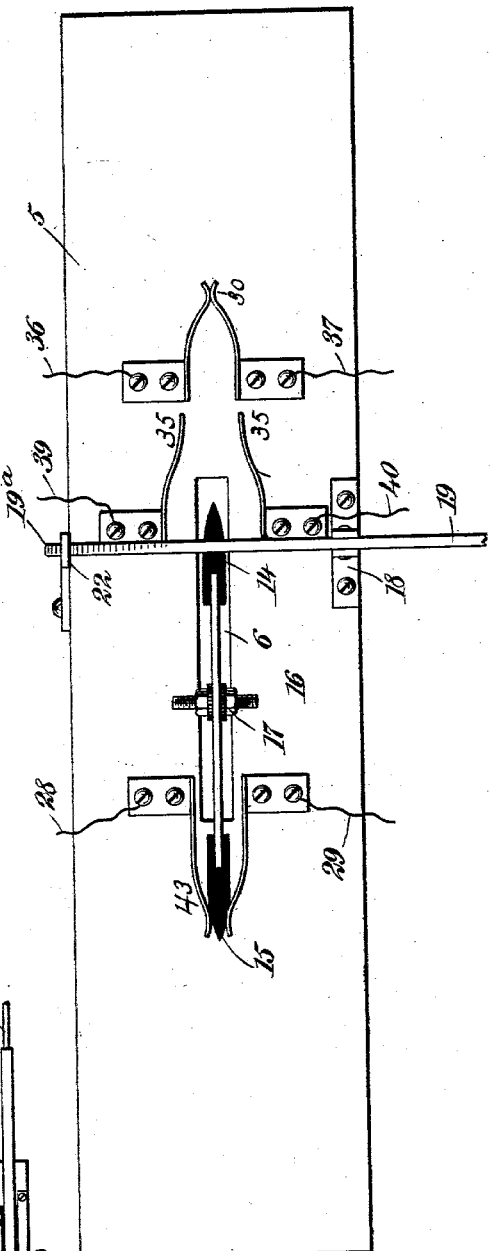
WITNESSES:
Edward Thorpe
N. F. Bernhard
INVENTOR
William S. Jackson
BY Munn
ATTORNEYS.

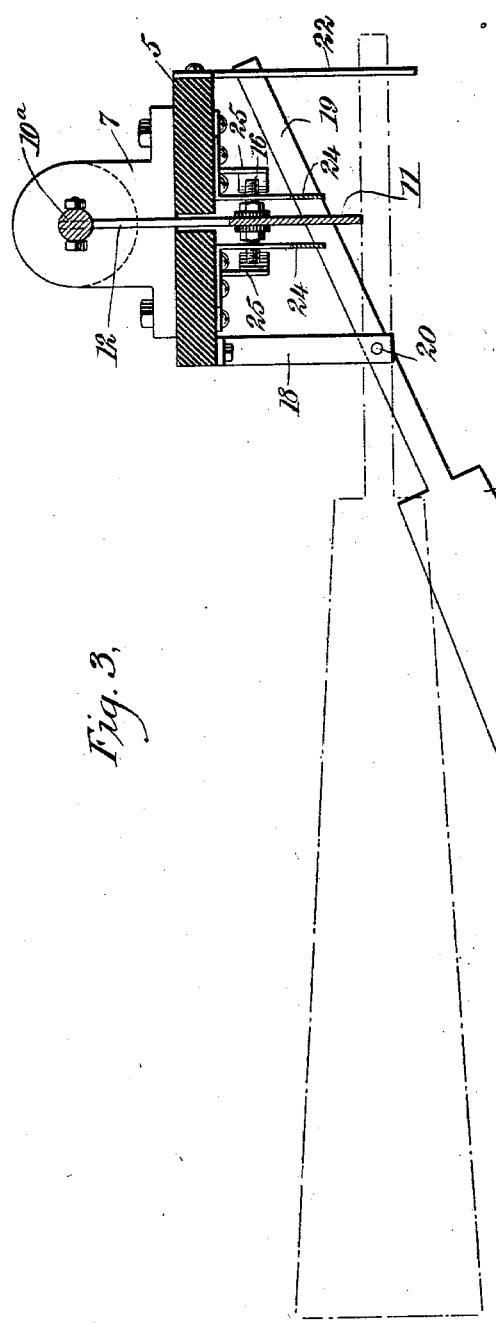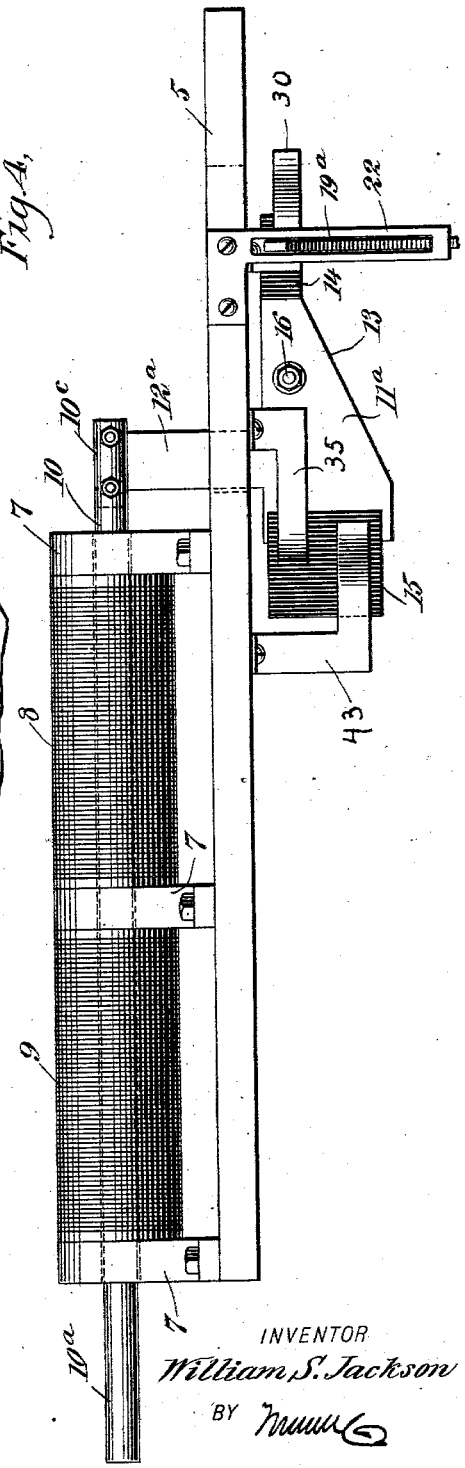

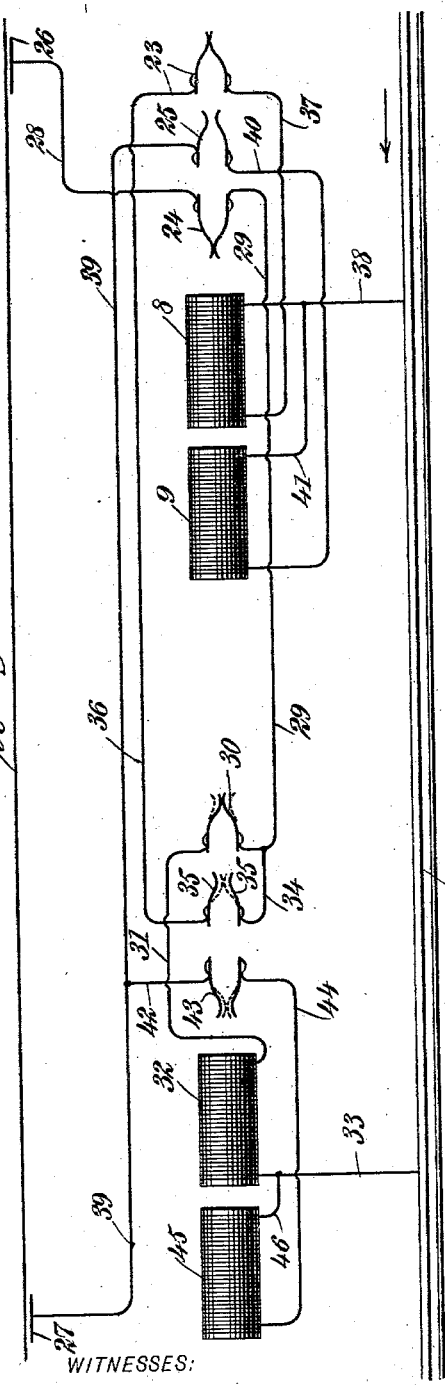
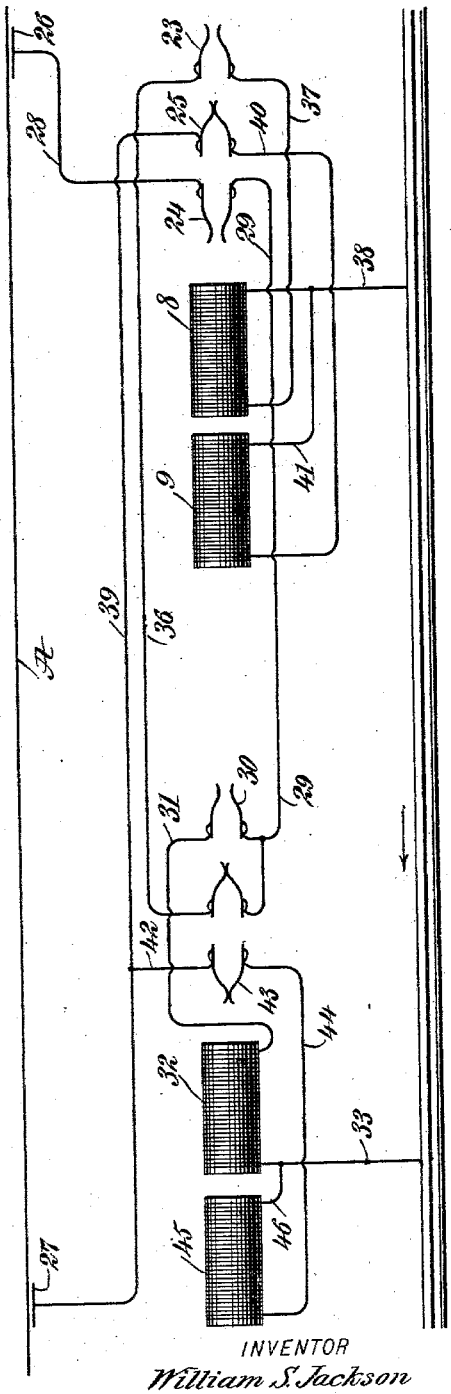

No. 743,878. PATENTED NOV. 10, 1903.
W. S. JACKSON.
ELECTRIC BLOCK SIGNAL.
APPLICATION FILED MAR. 5, 1903.
NO MODEL. 5 SHEETS—SHEET 4.
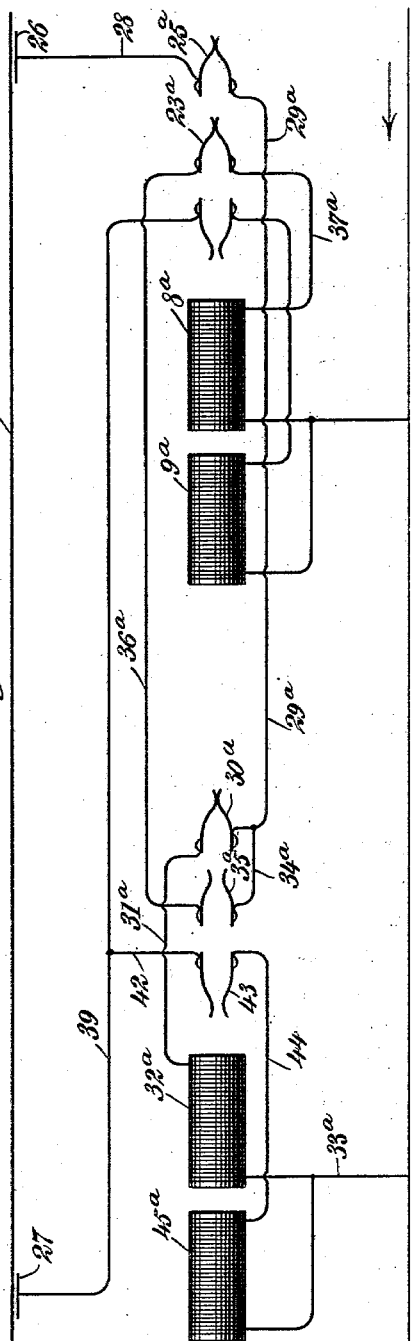
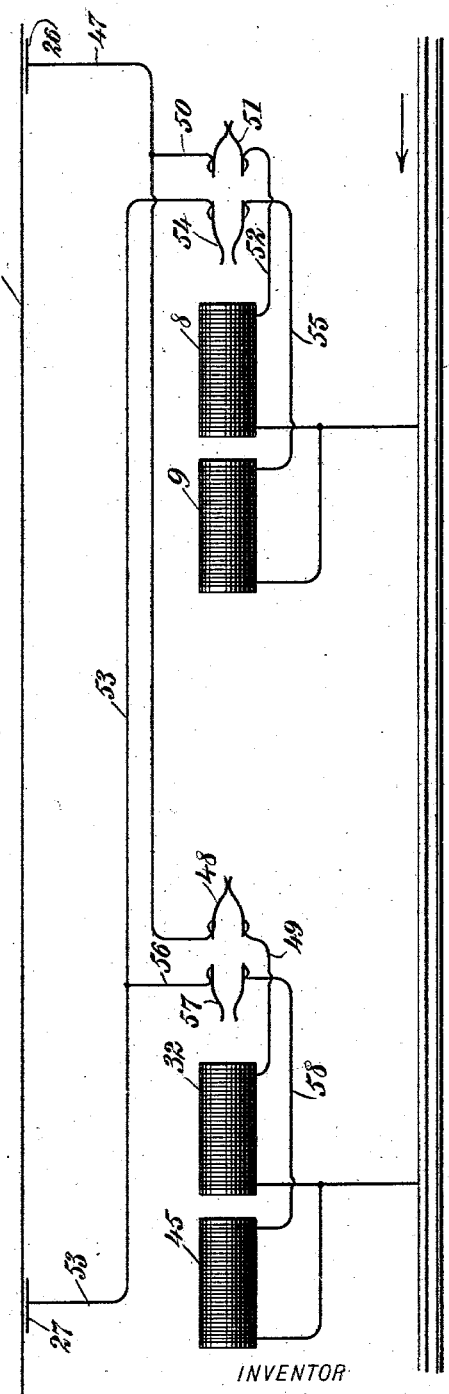
WITNESSES:
Edward Thorpe,
INVENTOR
William S. Jackson
BY
ATTORNEYS.

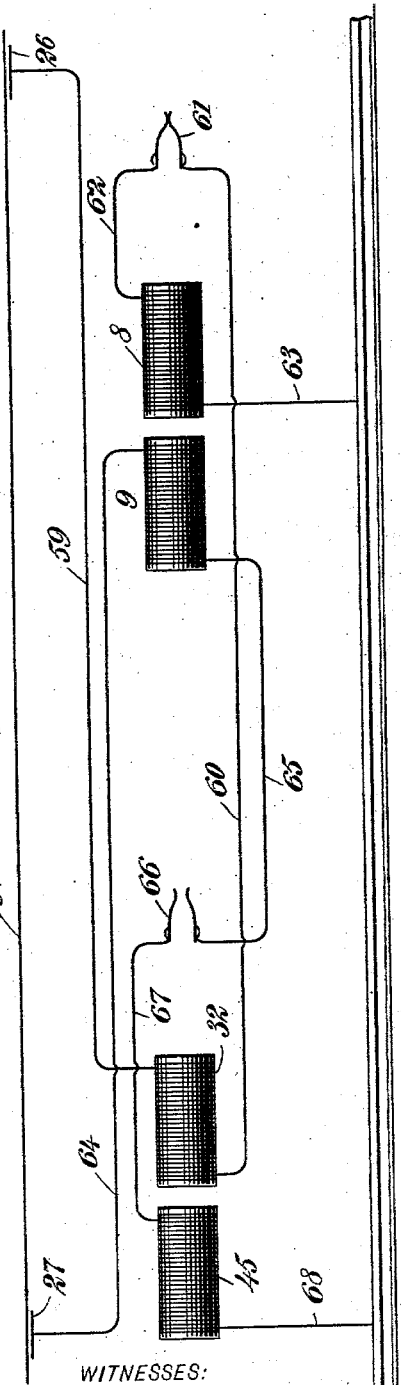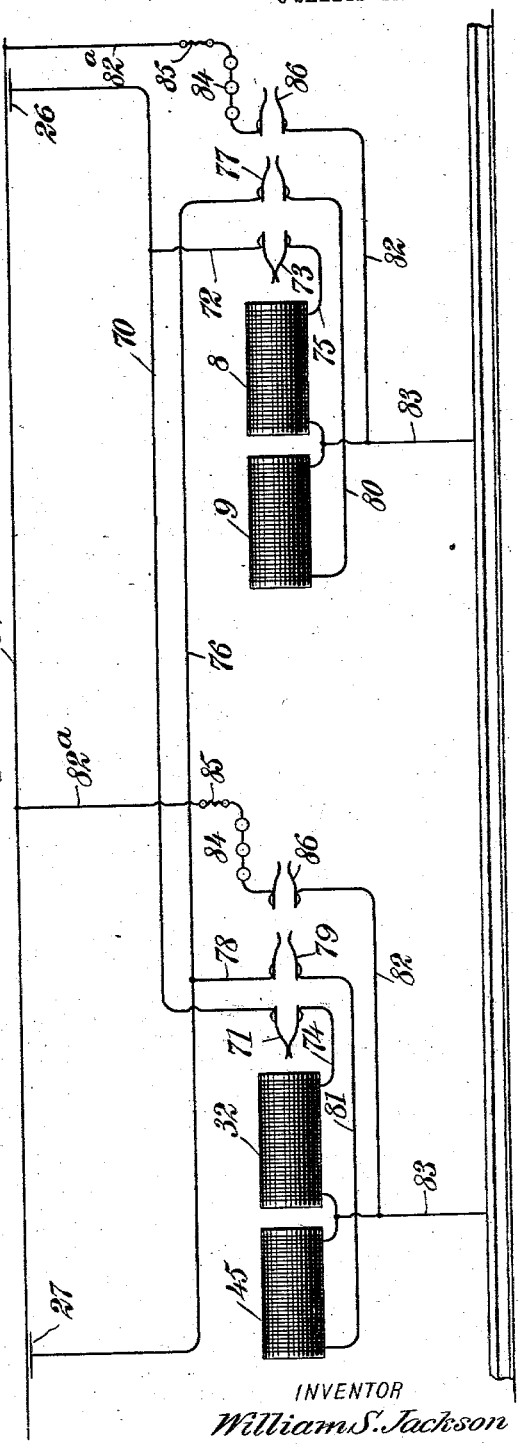

No. 743,878. Patented November 10, 1903.

UNITED STATES PATENT OFFICE.

WILLIAM S. JACKSON, OF HOBOKEN, NEW JERSEY, ASSIGNOR OF ONE-HALF TO DAVID YOUNG, OF NEWARK, NEW JERSEY.

ELECTRIC BLOCK-SIGNAL.

SPECIFICATION forming part of Letters Patent No. 743,878, dated November 10, 1903.

Application filed March 5, 1903. Serial No. 146,399. (No model.)

*To all whom it may concern:*

Be it known that I, WILLIAM S. JACKSON, a citizen of the United States, and a resident of Hoboken, in the county of Hudson and State of New Jersey, have invented a new and Improved Electric Block-Signal, of which the following is a full, clear, and exact description.

My invention relates to electric block-signaling systems especially adapted for use in connection with overhead electric railways, although essential parts of my invention may be used in connection with other kinds of systems.

The new system of my invention is primarily designed for installation and service on single-track electric railways which are commonly supplied with "turnouts" or "sidings" forming a block or section whereon one car or train may be switched for the purpose of clearing the main line for the passage of another car or train moving in the opposite direction and having the right of way over the road. Said improved signal system in its broad aspect contemplates the employment of local and distant signals in the form of semaphores or their equivalents, the local signal being adjacent to the entrance to the block, siding, or turnout, and the distant signal being located at or near the departure end of the block, siding, or turnout. The utility of the local signal is to warn a car or train following the one occupying the block, siding, or turnout that the latter is occupied, while the distant signal notifies the car or train moving in the opposite direction and having the right of way over the line that the block is occupied, and consequently the track is clear for the last-named train to proceed. Of course the local and distant signals may be located any suitable or desired distance from each other, and one signal may be placed in such a position that an observer approaching or near the other signal cannot see it; hence the apparent necessity for the use of the two signals in the improved system. One of the important features of this system is the employment of means by which the distant signal is made effective in controlling the home signal when the entrance trolley-controlled contact of the circuit is closed by a car entering the block, siding, or turnout. The signal-controlling devices in the preferred form of the invention are so organized and related that the closure of the entrance-contact by a car or train passing into the block or siding first displays the distant signal, thus warning a car or train approaching in an opposite direction on the track of the occupancy of the block, and this distant signal in turn operates the signal-setting devices to display the local or entrance semaphore, thus notifying the engineer or motorman of the car in the block that the distant signal is set at a displayed position, whereby the distant and local signals are set successively and notice is given to a train traveling in either direction on the main line that the siding or turnout is occupied.

In the present invention I aim to simplify and generally improve the system disclosed in a prior application for Letters Patent, filed by me on June 30, 1902, Serial No. 113,772, wherein I have disclosed a circuit which includes entrance and departure contacts, gravity-semaphores, and actuating devices so arranged and combined as to set the distant signal on the entrance of a car into a block and thereafter set the entrance-signal, and upon the departure of the car from the block said setting devices are operated to allow both semaphores to return by gravity to safety positions.

Further objects and advantages of the invention will appear in the course of the subjoined description and the novelty will be defined by the annexed claims.

Reference is to be had to the accompanying drawings, forming a part of this specification, in which similar characters of reference indicate corresponding parts in all the figures.

Figure 1 is a side elevation of a signal-setting mechanism having its contacts arranged for use in connection with the distant signal located at the departure end of the block in the system of wiring shown by Figs. 5 and 6. Fig. 2 is an inverted or bottom plan view of the signal-setting mechanism shown by Fig. 1. Fig. 3 is a vertical transverse section in the plane of the dotted line 3 3 of Fig. 1 looking in the direction of the arrow and showing the semaphore adjusted to its displayed position by dotted lines. Fig. 4 is an elevation of another form of signal-setting mechanism contemplated by my invention. Figs. 5 and 6 are diagrammatic views of a circuit including signal-setting mechanisms and adapted to operate in a way to successively display the departure-semaphore and the entrance-semaphore on the admission of a car to a block, the full lines in said Fig. 5 showing the normal condition of the several circuit-contacts before the entrance of a car into the block, while the dotted lines in Fig. 5 and the full lines in Fig. 6 show the condition of the contacts after the car enters the block, but before its departure therefrom. Fig. 7 is a diagrammatic view illustrating the solenoids of the signal-setting mechanism included in the circuits in such a way as to successively display the semaphores and successively return said semaphores to their normal positions, the contacts being shown in their normal positions. Fig. 8 is another diagrammatic view of the system, wherein the solenoids of the signal-setting mechanisms are connected in multiple, to the end that the entrance and departure semaphores may be displayed simultaneously and in like manner returned to normal positions, the contacts being shown in their normal positions. Fig. 9 is another diagrammatic view, in which the solenoids of the signal-setting mechanisms are connected in series in a manner to simultaneously display both semaphores and to simultaneously return the semaphores at proper intervals, the contacts being shown in their normal positions. Fig. 10 is a diagrammatic view of another method of wiring which is calculated to connect the solenoids of the signal-setting mechanisms in multiple, so as to simultaneously display both semaphores and in like manner return both semaphores to their normal positions, the contacts being shown in their normal positions; and Figs. 11 and 12 are views in side elevation and plan of a contact-bridge adapted for use at the entrance to and departure from a block.

In the embodiment of the signal-setting mechanism shown by Figs. 1, 2, and 3 I employ a base 5, which may be of wood or any other suitable material, said base adapted to be placed in an elevated position adjacent to the point where it is desired to display a semaphore. This base is provided with a longitudinal slot 6, and on the base are erected the supports 7, the same being arranged in pairs and adapted to carry the solenoids 8 9. Said solenoids are arranged in axial alinement to receive the core, which, as shown, consists of the soft-metal members 10 10$^a$ and the non-magnetic member 10$^b$; but it is not necessary to employ a core of this character, because I prefer to employ a single continuous bar or rod plunger of soft iron. The member 10 is arranged to play in the solenoid 8, while the member 10$^a$ is adapted to travel in the solenoid 9, and by alternately energizing the solenoids the core is given a reciprocating motion in a manner well understood by those skilled in the art.

One of the important features of my invention consists in the provision of a semaphore-actuating shoe 11, which is connected directly with the reciprocatory core to be movable with the same as it is reciprocated by the action of the solenoids. This shoe is preferably disposed in a horizontal position below the base 5, and it is provided with an upstanding shank 12, which passes through the slot 6 of the base and is fastened directly to the plunger or magnet-core. The shoe 11 is provided with a beveled edge or face 13, as shown more clearly by Fig. 1, thus giving the shoe the appearance of a wedge or cam, and in some embodiments of the signal-setting mechanism the shoe is equipped with insulated members 14 15, the same being disposed at the opposite ends of the shoe and adapted to engage with suitable contacts, to be presently described. The shoe 11 is also provided with a suitable form of circuit-closer, one style of which is represented by the drawings in the form of a threaded stem 16 arranged transversely through the shoe, at or about the middle thereof, said stem being insulated electrically from the shoe and clamped in place by suitable nuts, as at 17, whereby the stem or circuit-closer is attached firmly to the shoe to travel therewith in its reciprocations.

The base 5 is furthermore provided with a hanger 18, and in this hanger is pivoted a semaphore 19, said semaphore having a shank pivoted by the pin 20 to the hanger and forming an arm 19$^a$, which lies in the path of the wedge or cam shaped edge 13 of the shoe. The arm 19$^a$ of the pivoted semaphore is slidably fitted in a slot 21 of a guide 22, pendent from the base 5 on the opposite side edge from the hanger 18, said slotted guide serving to limit the movement of the semaphore-arm when it is acted on by the wedge-shaped edge of the shoe, thus relieving the semaphore and its pivot from undue strain.

In the method of wiring shown by Figs. 5 and 6 to produce the circuits I employ at each signal-setting mechanism a series of contacts. A normally closed contact 30 lies in the path of the insulated section 14 at one end of the shoe. A similar closed contact 43 is in the path of the insulation 15 at the opposite end of the shoe, while a normally open contact 35 is in the path of the circuit-closer stem 16, secured to the shoe; but I do not desire to limit myself to the particular arrangement of contacts employed in connection with the shoe of each signal-setting mechanism, because I am aware that the number and arrangement of the contacts will depend upon the wiring of the circuits, as hereinafter described, and represented by Figs. 5 to 10, inclusive, of the drawings.

It is to be understood that the arrangement of the contacts shown by Fig. 2 and controlled by the departure-semaphore is different from the contacts controllable by the entrance-semaphore and that the contacts shown in full lines by Figs. 1, 2, and 3 are in their normal positions when the departure-semaphore is in the lowered safety position.

Before proceeding to describe in detail the circuits I desire to explain that the semaphore 19 normally occupies a lowered position to denote "safety;" but this semaphore is adapted to be actuated positively by the movement of the shoe 11 in one direction in order that the semaphore may be moved to its displayed position. This movement of the shoe depends upon the movement of the core, and normally the core and the semaphore occupy the positions shown by full lines in Figs. 1, 2, and 3. When a car enters the block, the circuit is closed and a current passes through the coil 8 to energize the latter and impart movement to the core from the left toward the right, thereby moving the shoe 11 across the arm of the semaphore and making the wedge-shaped edge of said shoe ride on said arm 19$^a$, thus elevating the semaphore on the pivot 20 and moving it to the displayed position shown by dotted lines in Fig. 3. When the car is in the block and after it shall have passed the entrance-contact, the core remains in its adjusted position, so that the member 10 thereof lies practically within the setting-solenoid 8, while the shoe 11 stays in engagement with the semaphore, so as to positively keep the latter in its displayed position, thus overcoming the employment of locking devices to maintain the semaphore in its displayed position and also dispensing with any other parts than the shoe to keep said semaphore in such displayed position. On the departure of a car from the block the solenoid 9 is energized by the current admitted to the circuit when the car-trolley engages with the departure-contact at the departure end of the block. The solenoid 9 now becomes effective to attract the core member 10$^a$, and the core is moved endwise in an opposite direction, carrying with it the shoe 11 and moving the parts to the full-line position in Figs. 1, 2, and 3, whereby the shoe is withdrawn from engagement with the semaphore and the latter is permitted to drop or return by gravity to its normal lowered position. From this description it will be apparent that movement of the shoe with the core in one direction makes the shoe act on the semaphore and elevates it to a displayed position; but the movement of the shoe with the core in an opposite direction withdraws the shoe from the semaphore and allows the latter to drop by gravity.

In the construction of the signal-setting device shown by Fig. 4 I have arranged the solenoids 8 9 in close relation and in alinement with each other; but the core is provided with a non-magnetic section 10$^c$ at one end thereof, said section carrying the shoe 11$^a$, which is provided with the shank 12$^a$, fastened to the non-magnetic section. In this form of construction the shoe is provided with the insulated members and with the cam-shaped edge, said edge adapted to ride against the arm of a semaphore which is hung on the base and arranged to have its arm slide in a slotted guide, all substantially as hereinbefore set forth in connection with the type of signal-setting mechanism shown by Figs. 1 to 3, inclusive.

The circuits shown by Figs. 5 and 6 represent the signal-setting devices in their respective positions before and after the admission of a car to a block, but prior to the departure of the car from the block. These figures of the drawings show the block-signal system in connection with the overhead trolley-conductor A of an electric railway, the track of which has the usual siding or turnout which forms the block or signal, one of the rails of said track being indicated at B and it being assumed that the car enters the block in the direction of the arrow shown by the drawings. At the points of entrance to and departure from the block I employ the entrance-contact 26 and the departure-contact 27. These contacts are each made in the way shown by Figs. 11 and 12 and as disclosed by my prior application, to which reference has heretofore been made. Each contact has a bridge $a$, adapted to receive the conductor A and provided with an insulation $b$. This bridge carries the long contact-plate $c$ and the short contact-plate $d$, arranged on opposite sides of the wheel-bearing face $e$. The contact-plate $c$ is in electrical metallic engagement with the bridge $a$, while the other contact-plate, $d$, is insulated by the material $b$ from the bridge and from the contact-plate $c$. When the trolley-wheel passes beneath the bridge $a$ of the overhead conductor, the flanges engage with the contact-plates $c$ $d$ in a way to divert the current from the conductor A into the signaling-circuit for the operation of the signal-setting mechanisms included in said circuit. From the circuit-contact 26 leads a conductor 28, having engagement with one member of the closed contact 24, from which leads another conductor, 29, that passes beyond the signal-setting mechanism at the entrance-point of the block and to a normally closed contact 30 adjacent to the signal-setting mechanism at the departure end of the block. From this contact 30 leads a conductor 31, which connects with a semaphore-setting solenoid 32, forming a part of the signal-setting mechanism at the departure end of the block, said solenoid having a ground connection 33. The conductor 29 has a branch 34 attached to one member of a normally open contact 35, from which leads a conductor 36, that extends back to a normally closed contact 23 of the signal mechanism at the entrance to the block, and from the other member of this closed contact 23 leads a conductor 37, which is connected with the solenoid 8, the latter having a ground connection 38. To the departure-contact 27 is connected a conductor 39, which extends from the signal-setting mechanism at the departure end of the block to the setting mechanism at the entrance end of the block, said conductor 39 being in electrical connection with one member of the normally open contact 25, from the other member of which contact leads a conductor 40, which is in circuit with the solenoid 9, the latter having a ground connection 41. Said conductor 39 from the departure-contact 27 also has a branch connection 42, which is connected with one member of a normally open contact 43, the other member of said contact having a wire 44 leading to the solenoid 45 at the departure-signal-setting mechanism, said solenoid 45 having a ground connection at 46. The system shown by these views, Figs. 5 and 6, has its contacts 23 24 25 and 30 35 43 so arranged with respect to the insulation and circuit-closers on the shoes of the two signal-controlling mechanisms that the distant and local semaphores will be displayed successively on the entrance of a car into the block formed by the siding or turnout, the display of the local semaphore depending upon or being controllable by the distant semaphore, whereas the two semaphores are returned simultaneously to their safety positions on the departure of the car from the block or siding. The solenoid-core, the shoe, and the circuit-closer for the departure-signal of Figs. 5 and 6 take the positions shown by Figs. 1, 2, and 3 to allow the plunger to partially extend through the solenoid 45 and for the shoe to have its insulation 15 spread the members of the contact 43, as indicated in full lines by Figs. 1, 2, and 5, whereas the contact 35 remains open and the contact 30 is closed. On the other hand, the solenoid-core, the shoe, and the parts on said shoe which are associated with the solenoids 8 9 and the contacts 23 24 25 at the entrance-signal are so arranged that the solenoid-core projects through the solenoid 9, the contact 23 is closed, the contact 25 is open, and the contact 24 is closed, the insulation corresponding to 15 being differently placed on the shoe for the entrance-signal, while the insulation 14 and closer 16 on the entrance-signal shoe remain the same. Both semaphores are thus at "safety," with the solenoid-cores in the solenoids 45 9, respectively, and the contacts 43 24 of the setting-circuit are opened and closed, respectively, by proper positions of the shoes.

In the operation of the system shown by Figs. 5 and 6 the entrance of a car moving in the direction of the arrow along the track into the block causes the trolley-wheel to engage the entrance-contact 26 and divert the current from the conductor A through the conductor 28 and the contact 24, thence through the conductor 29, the contact 30, and the conductor 31, and finally through the solenoid 32 at the departure end of the block. This solenoid is thus energized to attract the core and move the shoe 11 in a direction to set the distant semaphore in a displayed position at the departure end of the block, and this movement of the shoe withdraws the insulation from the contact 43 and moves the insulation 14 between the parts of the contact 30, thus closing 43 and opening 30, while the circuit-closer 16 closes the circuit through the contact 35 before the trolley leaves the entrance-contact 26, whereupon a portion of the current finds its way through the conductors 28 29, the branch conductor 34, the contact 35, the conductor 36, the contact 23, the conductor 37, and the solenoid 8, thereby energizing the latter and moving the core and the shoe of the signal-setting mechanism at the entrance to the block so that the local semaphore at the entrance will be set to a displayed position after the semaphore is displayed at the departure end of the block, thereby insuring the successive setting of the semaphores in a way to notify the motorman of the incoming car that the distant signal has been set before the home signal is displayed. The movement of the shoe at the entrance-signal operates to open the contact 24 in the setting-circuit and to also open the contact 23 between the solenoids 32 8 of said setting-circuit, while the circuit-closer (corresponding to 16) on said shoe serves to close the contact 25 of the return-circuit, which includes the solenoids 9 45, the departure-contact 27, and the contacts 25 43. The condition of the circuit is shown by Fig. 6, wherein the car has passed the entrance-signal and is approaching the departure-signal, and when the trolley engages with the departure-contact 27 the current passes through the conductors 39 42, the contacts 25 43, the conductors 40 44, the solenoids 9 and 45, and the ground connections, so as to simultaneously energize the two return-solenoids and move the cores and the shoes in opposite directions simultaneously, whereby the shoes are withdrawn from the semaphores and the latter are allowed to return by gravity to their normal positions.

In Fig. 7 of the drawings I have shown another method of wiring for use in connection with the series of contacts and the solenoids forming parts of the signal-setting mechanisms at the entrance to and departure from the block, said solenoids for setting the signals being so connected as to successively display the distant signal and the entrance-signal when a car enters the block in the direction of the arrow, while the return-solenoids are connected in multiple to simultaneously withdraw the shoes and allow both of the semaphores to return to "safety" when the car leaves the block. The arrangement of the contacts and conductors, however, to the entrance of the block is changed somewhat. In this method of wiring the normal positions of the circuits before the entrance of a car into the block is shown by Fig. 7, and the setting-circuit is modified from the construction of Figs. 5 and 6 in that the conductor 28 is attached to one member of the closed contact 25ª, from which leads a conductor 29ª, extending to the closed contact 30ª, from which extends a conductor 31ª, leading to the solenoid 32ª, having a ground connection 33ª. The conductor 29ª has a branch connection 34ª to an open contact 35ª, from which leads a conductor 36ª, attached to the closed contact 23ª, from which leads a conductor 37ª, extending to the solenoid 8ª. The other conductors and contacts are arranged to connect the solenoids 9ª and 45ª in multiple, the same as in the system disclosed by Figs. 5 and 6. Of course the insulation 15 on the shoes of the solenoid-cores for the distant and home signals should be properly arranged when the parts are normal to close contacts 25ª and 30ª and open contact 35ª of the setting-circuit, which includes solenoids 8ª and 32ª, while the contacts of the return-circuit having solenoids 9ª and 45ª are both open. The two solenoid-cores are moved successively to the right in Fig. 7 when the circuit is closed through 26 to first display the distant semaphore and then the local semaphore; but when contact 27 is closed the solenoids 9ª 45ª are energized simultaneously to return both semaphores by gravity to their safety positions.

In the arrangement of the circuit shown by Fig. 8 the semaphore-setting solenoids and the semaphore-returning solenoids are connected in multiple for the purpose of simultaneously actuating the signal-setting devices to display the semaphores in their danger positions at one operation at the entrance of a car into the block and in like manner to return the semaphores to their lowered safety positions on the exit of the car from the block; but in this method of controlling the semaphores I aim to reduce the number of contacts, although the signal-setting devices at the entrance and departure points are substantially the same as hereinbefore described, because I retain the setting and return solenoids with their cores, the shoes, and the gravity-semaphores.

From the entrance-contact 26 leads a conductor 47, which extends to the closed contact 48 at the departure-signal, the latter having a conductor 49, leading to the setting solenoid 32, and this conductor 47 is furthermore provided with a branch 50, connected with the closed contact 51, which has connection through the wire 52 with the setting-solenoid 8 of the entrance-signal. The departure-contact 27 has a conductor 53, which leads through an open contact 54, having a connection at 55 with the return-solenoid 9 at the entrance-signal, said conductor 53 also having a branch connection 56 with an open contact 57, which has connection with the return-solenoid 45 at the departure-semaphore through the wire 58. The pairs of setting and return solenoids for the entrance and departure semaphores each have proper ground connections, as shown by Fig. 8, which represents the parts in their normal positions when the block is unoccupied. The entrance of a car closes the circuit at 26 and the current passes through the conductors 47 50, the contacts 48 51, and the solenoids 8 32 to move the cores and the shoes simultaneously in one direction, thereby making the shoes move the semaphores to displayed positions, said shoes being provided with proper insulation for opening the contacts 48 51 when the semaphores are displayed, and thereby deënergize the solenoids 8 32, so that the semaphores will remain in their displayed positions while the car continues to occupy the block. When the car reaches the block, the contact 27 is closed and the current passes through the conductors 53 56, the contacts 54 57, which are closed by the previous movement of the solenoids and the shoes, the conductors 55 58, and the solenoids 9 45, and thereupon the cores are moved in an opposite direction and the shoes are withdrawn from the semaphores simultaneously to allow the semaphores to drop by gravity to their lowered safety positions. This return of the shoes and the cores to their normal positions opens the contacts 54 57 and closes the contacts 48 51, so as to restore the circuit to a condition for operation by the entrance of the next car into the block.

A simple form of circuit is shown by Fig. 9 of the drawings, wherein the setting and return solenoids at the departure and entrance semaphores are each connected in series with a view to simultaneously displaying the semaphores and in like manner permitting them to return to their lowered positions on the entrance and departure, respectively, of a car into and from the block. This circuit contemplates the employment of the departure and entrance semaphores with the solenoids, the cores therefor, and the shoes, but the number of contacts is materially reduced. The circuit entrance-contact 26 has a wire 59, connected with the setting-solenoid 32 of the departure-semaphore, from which solenoid leads a conductor 60 to a closed contact 61, having a branch conductor 62, that is connected with the setting-solenoid 8 of the entrance-signal, said solenoid having the ground connection 63. The departure-contact 27 has a conductor 64, which is connected directly with the return-solenoid 9 of the entrance-semaphore, from which leads a conductor 65, attached to a normally open contact 66, having a branch connection 67 with the return-solenoid 45 of the departure-semaphore, said solenoid having a ground connection 68. When the circuit is closed through the contact 26, the current passes through the conductor 59, the solenoid 32, conductor 60, contact 61, wire 62, and solenoid 8, thus energizing the two solenoids 32 8 and moving the cores and the shoes in one direction, so as to simulaneously display the semaphores and making one shoe close the contact 66, while the other shoe opens the contact 61. The car in leaving the block closes the circuit through the contact 27, so that the current passes through the conductor 64, the solenoid 9, conductor 65, contact 66, wire 67, solenoid 45, and ground 68, whereby the two solenoids 9 45 are energized to move the cores and the shoes simultaneously in an opposite direction and allow both semaphores to drop by gravity.

The wiring shown by Fig. 10 serves to connect the setting and return solenoids in multiple with a view to simultaneously displaying both semaphores on the entrance of a car into the block, and on the departure of the car the semaphores are simultaneously released and allowed to drop by gravity to their safety positions. From the entrance-contact 26 leads a conductor 70, which is shown as extending along the block to an open contact 71 at the departure-semaphore. From the conductor 70 leads a branch wire 72, connected to a contact 73, and from these contacts 71 73 lead other branch conductors 74 75, which are connected to the setting-solenoids 32 8, respectively. From the departure-contact 27 leads a conductor 76, which extends along the track to a contact 77 at the entrance-semaphore, and from this conductor 76 extends a branch conductor 78, attached to one member of a contact 79. Other branch conductors 80 81 lead from the respective contacts 77 79 to the return-solenoids 9 41, respectively. In this method of wiring I employ a plunger similar to the plunger 10 in the system of Figs. 1 to 3, inclusive, said plunger having an elongated non-magnetic section between soft-iron cores, the parts being so proportioned as to leave a portion of one soft-iron core in one of the solenoids when the plunger is at rest, so that a part of the soft-iron plunger is in the magnetic field of one of the solenoids. I may, however, use a plunger consisting of a soft-iron core and an end portion of non-magnetic material. The circuit-closers and the insulated shoes on the plungers of the two sets of solenoids are arranged to traverse the contacts 71 73 and 77 79 in the back-and-forth movements of the plungers for the purpose of making and breaking the circuits.

While the operation of the semaphores depends in no way upon lights, I may employ them in any suitable arrangement of the circuits, one form being shown by Fig. 10. A separate lighting-circuit 82ª is shown adjacent to the entrance and departure semaphores, each circuit having a conductor to be supplied from the line A and connected to the ground connection 83 from the solenoids. Each lighting-circuit has a series of lamps 84 and a fuse 85, and in this circuit is a switch 86, that is disposed adjacent to one of the contacts 77 or 79, so as to lie in the path of the plunger-shoe, whereby the lights may be turned on by the same movement of the plunger that displays the semaphore at "danger."

Having thus described my invention, I claim as new and desire to secure by Letters Patent—

1. An electric block-signal having a semaphore, a setting-shoe movable in a rectilinear path across the semaphore and operable to directly set the latter, and circuit-controlled setting devices for imparting reciprocating movement to said shoe.

2. An electric block-signal having a gravity-semaphore, a slidable shoe movable across the path of the semaphore for engagement directly therewith to positively display the same and withdrawable from said semaphore for the latter to drop by gravity, and electromagnetic setting devices to impart slidable movement to the shoe.

3. An electric block-signal having a pivoted gravity-semaphore, a shoe movable in a rectilinear path across the semaphore and having a cam-shaped surface disposed to ride directly on a part of the semaphore, and circuit-controlled setting devices for imparting reciprocating movement to the shoe.

4. An electric block-signal having solenoids, a reciprocable core controllable thereby, a gravity-semaphore, and a shoe carried by the core and reciprocable therewith in a rectilinear path across the path of the semaphore, said shoe being arranged to ride on the semaphore.

5. An electric block-signal system, comprising local and distant signals, a setting-circuit including an entrance-contact and setting-solenoids, a return-circuit including a departure-contact and return-solenoids, cores controllable by the solenoids in the two circuits and adapted to actuate means for displaying the signals, and contacts in the circuits controllable by the movement of the signals for opening and closing said circuits.

6. An electric block-signal system, comprising local and distant signals, a setting-circuit including two magnets and contacts located in said circuit between the magnets thereof, means controllable by the magnets in said setting-circuit for displaying the signals and opening the setting-circuit when said signals are displayed, a return-circuit also including two magnets and contacts located in said circuit between the magnets thereof, said magnets of the return-circuit being effective to withdraw the signal-setting means and act on the contacts to restore both circuits, signals, and contacts to normal positions, and entrance and departure contacts in the setting and return circuits, respectively.

7. An electric block-signal having entrance and departure contacts, entrance and departure semaphores, coaxially-arranged solenoids adjacent to each semaphore at the respective points of entrance and departure of a block, a core controllable by each pair of solenoids, a reciprocable shoe carried by each core and arranged to ride directly on one semaphore for positively displaying the same, and contacts in circuit with the solenoids and in the path of the shoes to be opened or closed by the movement of said shoes in one direction or the other.

8. An electric block-signal having normally open entrance and departure contacts adjacent to a trolley-conductor, gravity-semaphores at the entrance and departure of a block, a pair of solenoids adjacent to each semaphore, reciprocable cores each controllable by one pair of solenoids, a reciprocable shoe carried wholly by each core for movement therewith and arranged to ride directly on a part of one semaphore for positively moving the latter to a displayed condition, and contacts in circuit with the solenoids and with the entrance and departure contacts and also disposed in the paths of the shoes to be opened and closed thereby for magnetizing and demagnetizing the solenoids by current derived from the trolley-conductor by the closing of the respective entrance and departure contacts.

9. An electric block-signal having a pair of solenoids, a core reciprocable thereby, a shoe movable with the core, a gravity-semaphore in the path of the shoe, and means for alternately energizing the solenoids; said core and shoe remaining normally at rest and the shoe being adapted to set the semaphore and to hold or lock it in a displayed position.

10. An electric block-signal system, comprising a circuit having entrance and departure contacts and setting-device contacts, solenoids in said circuits, cores controllable by the solenoids, semaphores arranged to drop by gravity, and shoes movable with the cores and arranged to positively display the semaphores and to engage the setting-device contacts.

11. An electric block-signal system comprising a circuit having entrance and departure contacts, semaphores at the ends of the block, setting and return solenoids included in circuits with the respective entrance and departure contacts, cores controllable by the respective pairs of said solenoids, shoes movable with the cores and controlling said semaphores, and contacts in circuit with the solenoids and with the entrance and departure contacts and also disposed in the paths of the shoes.

12. An electric block-signal system having circuits which include normally open entrance and departure contacts, setting and return solenoids included in circuit with the respective contacts and grouped in pairs, cores each reciprocable by a pair of setting and return solenoids, shoes movable with said cores, shoe-contacts in circuit with the solenoids and with the entrance and departure contacts, said shoe-contacts being disposed in the path of said shoes, and signals controllable by the movement of the shoes.

13. An electric block-signal system having entrance and departure semaphores, signal-controllers in coöperative relation to said semaphores, a setting-circuit including a setting-contact and two magnets which coöperate with the signal-controllers of both semaphores for displaying the departure-semaphore on the entrance of a car into the block, means actuated by the display of the departure-semaphore for thereafter displaying the entrance-semaphore, and a return-circuit including a departure-contact and two magnets which also coöperate with both of the signal-controllers for returning both semaphores to normal positions on the departure of a car from the block; the setting and return circuits and their magnets being operable independently one of the other and adapted to actuate both of the signal-controllers and the two semaphores.

14. An electric block-signal system having independent setting and return circuits each including a trolley and a pair of magnets, the magnets in the respective circuits being grouped in pairs adjacent the points of entrance to and departure from a block, entrance and departure semaphores, and a signal-controller operatively related to each semaphore, each controller including means adapted to be moved in opposite directions by the respective magnets of a pair in the setting and return circuits, and said controllers when acted on by the magnets of the setting-circuit being effective in displaying the departure and entrance semaphores in successive order.

15. An electric block-signal system comprising independent setting and return circuits each including a trolley-contact and a pair of magnets, the magnets in the respective circuits being grouped in pairs adjacent to the points of entrance to and departure from a block, entrance and departure semaphores each mounted to remain by gravity normally in safety positions, and signal-controllers for the respective semaphores, each signal-controller including a shoe arranged to traverse the path of one gravity-semaphore and also including means adapted to be influenced in opposite directions by the respective magnets of a pair in the setting and return circuits.

16. An electric block-signal system comprising independent normally open setting and return circuits each including a trolley-controlled contact and a pair of magnets, the magnets in the respective circuits being grouped in pairs adjacent to the points of entrance to and departure from a block, entrance and departure semaphores, semaphore-contacts located in the respective circuits in the path of the semaphores, one set of the contacts in the setting-circuit being controllable by the departure-semaphore, for energizing the magnet of the entrance-semaphore subsequently to the movement of the departure-semaphore to a displayed position, and signal-controllers operatively related to the semaphores, each controller including means adapted to be moved in opposite directions by the influence of the respective magnets in said setting and return circuits.

17. An electric-railway block-signal, comprising gravity-semaphores located at the entrance to and departure from a block, independent setting and return circuits having entrance and departure contacts, and electromagnetic setting devices including shoes arranged to traverse the path of the semaphores and controllable by said circuits and operatively related to each other and to the semaphores for positively displaying first the departure-semaphore and thereafter displaying the entrance-semaphore on admission of a car to the block, said shoes of the setting devices being withdrawable from the semaphores and allowing the latter to return by gravity to normal positions.

In testimony whereof I have signed my name to this specification in the presence of two subscribing witnesses.

WILLIAM S. JACKSON.

Witnesses:
  JNO. M. RITTER,
  H. F. BERNHARD.